United States Patent
Kurata et al.

(10) Patent No.: US 9,217,394 B2
(45) Date of Patent: Dec. 22, 2015

(54) MULTI-STAGE SUPERCHARGING APPARATUS

(75) Inventors: Iori Kurata, Fujisawa (JP); Shinobu Uno, Fujisawa (JP); Kazutaka Ooishi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 114 days.

(21) Appl. No.: 13/976,331

(22) PCT Filed: Dec. 7, 2011

(86) PCT No.: PCT/JP2011/078285
§ 371 (c)(1),
(2), (4) Date: Jun. 26, 2013

(87) PCT Pub. No.: WO2012/090662
PCT Pub. Date: Jul. 5, 2012

(65) Prior Publication Data
US 2013/0269341 A1    Oct. 17, 2013

(30) Foreign Application Priority Data

Dec. 28, 2010    (JP) ................. 2010-293713

(51) Int. Cl.
*F02B 33/44*    (2006.01)
*F02M 25/07*    (2006.01)
(Continued)

(52) U.S. Cl.
CPC .............. *F02M 25/07* (2013.01); *F02B 37/004* (2013.01); *F02B 37/013* (2013.01); *F02B 37/18* (2013.01); *F02C 6/12* (2013.01); *F02B 37/183* (2013.01); *Y02T 10/144* (2013.01)

(58) Field of Classification Search
CPC ...... F02B 37/004; F02B 37/013; F02B 37/18; F02B 37/183; F02C 6/12; F02M 25/07; Y02T 10/144
USPC ................................ 60/605.1, 612
See application file for complete search history.

(56) References Cited

U.S. PATENT DOCUMENTS 3,576,102 A * 4/1971 West ................. 60/602
4,463,564 A * 8/1984 McInerney .......... 60/602
(Continued)

FOREIGN PATENT DOCUMENTS

EP    1672197 A1    6/2006
JP    2002-115556    4/2002
(Continued)

OTHER PUBLICATIONS

Written Opinion of the International Searching Authority mailed Jan. 17, 2012 in corresponding International Application No. PCT/JP2011/078285.
(Continued)

*Primary Examiner* — Audrey K Bradley
(74) *Attorney, Agent, or Firm* — Staas & Halsey LLP

(57) ABSTRACT

A multi-stage supercharging apparatus including a first supercharger and a second supercharger. The first supercharger is provided with a first turbine accommodating section, a first exhaust inlet, and a first exhaust outlet which extends in an axial direction of the first turbine from the first turbine accommodating section and is bent upward. The second supercharger is provided with a second turbine, a second turbine accommodating section, and a second exhaust inlet which is directly connected to the first exhaust outlet to allow the first exhaust outlet to be communicated with the second turbine accommodating section, and the second supercharger is supported by the first supercharger by placing an opening of the second exhaust inlet on an opening of the first exhaust outlet.

1 Claim, 5 Drawing Sheets

(51) Int. Cl.
*F02B 37/00* (2006.01)
*F02B 37/013* (2006.01)
*F02B 37/18* (2006.01)
*F02C 6/12* (2006.01)

(56) References Cited

U.S. PATENT DOCUMENTS

| | | | |
|---|---|---|---|
| 2004/0011037 A1* | 1/2004 | Zimmer et al. | 60/612 |
| 2004/0040300 A1 | 3/2004 | Klingel | |
| 2007/0169479 A1* | 7/2007 | Nicolle et al. | 60/612 |
| 2009/0014674 A1 | 1/2009 | Grissom et al. | |

FOREIGN PATENT DOCUMENTS

| | | | | |
|---|---|---|---|---|
| JP | 2004-92646 | | 3/2004 | |
| JP | 2005-133651 | | 5/2005 | |
| JP | 2008057448 A | * | 3/2008 | F02B 39/00 |
| JP | 2009-92045 | | 4/2009 | |
| JP | 2010-507045 | | 3/2010 | |
| JP | 2010-248982 | | 11/2010 | |
| JP | 2010-285959 | | 12/2010 | |
| WO | 2008/048918 | | 4/2008 | |

OTHER PUBLICATIONS

International Search Report mailed Jan. 17, 2012 in corresponding International Application No. PCT/JP2011/078285.
Patent Abstracts of Japan, Publication No. 2002-115556, published Apr. 19, 2002.
Patent Abstracts of Japan, Publication No. 2004-092646, published Mar. 25, 2004.
Patent Abstracts of Japan, Publication No. 2005-133651, published May 26, 2005.
Patent Abstracts of Japan, Publication No. 2009-092045, published Apr. 30, 2009.
Patent Abstracts of Japan, Publication No. 2010-248982, published Nov. 4, 2010.
Patent Abstracts of Japan, Publication No. 2010-285959, published Dec. 24, 2010.
Supplementary European Search Report dated Nov. 10, 2014 in corresponding European Patent Application No. 11854412.1.

* cited by examiner

MULTI-STAGE SUPERCHARGING APPARATUS

CROSS-REFERENCE TO RELATED APPLICATIONS

This application claims the foreign priority benefit of Japanese Application No. 2010-293713 filed Dec. 28, 2010, the contents of which are incorporated herein by reference, which serves as priority for PCT Application No. JP2011/078285 filed Dec. 7, 2011.

TECHNICAL FIELD

The present invention relates to a multi-stage supercharging apparatus, and particularly to a multi-stage supercharging apparatus that includes a first supercharger and a second supercharger which are driven by an exhaust gas of an engine.

BACKGROUND ART

A two-stage supercharging system (multi-stage supercharging apparatus) has been known as a system which efficiently recovers the exhaust energy of an engine. In the two-stage supercharging system, generally, a high-pressure stage turbine of a high-pressure stage turbocharger (a first supercharger) and a low-pressure stage turbine of a low-pressure stage turbocharger (a second supercharger) are arranged in series from an upstream side of an exhaust gas flowing in an exhaust passage. Further, a low-pressure stage compressor of a low-pressure stage turbocharger and a high-pressure stage compressor of a high-pressure stage turbocharger are arranged in series from an upstream side of an intake air flowing in an intake passage. Moreover, the two-stage supercharging system is configured so as to be capable of supercharging by rotationally driving the high-pressure stage turbine and the low-pressure stage turbine using the exhaust gas of the engine and additionally compressing the intake air compressed by the low-pressure stage compressor by the high-pressure stage compressor.

For example, Patent Document 1 discloses a multi-stage supercharging apparatus including a high-pressure stage supercharger and a low-pressure stage supercharger, in which an intake passage and an intercooler are integrally formed in order to minimize the entire apparatus.

PRIOR ART DOCUMENTS

Patent Document 1: Japanese Patent Application Publication No. 2010-248982

In the two-stage supercharging system, however, two turbochargers such as a high-pressure stage turbocharger and a low-pressure stage turbocharger are mounted and it is necessary to fix these two turbochargers to, for example, an engine.

In order to support two turbochargers, therefore, brackets are necessarily provided in these two turbochargers, respectively. Further, the apparatus becomes a complicated exhaust pipe as a whole shape, resulting in increasing a channel resistance of an exhaust gas channel, and thus there is a possibility to increase a pressure loss of an exhaust gas flowing. Moreover, there is a possibility to degrade the seal property in a connection portion (piping fastened portion) of two turbochargers by the weight of the turbochargers.

SUMMARY OF THE INVENTION

The present invention has been designed in consideration of these problems, and an object thereof is to provide a multi-stage supercharging apparatus capable of improving the seal property in the connection portion of a high-pressure stage turbocharger and a low-pressure stage turbocharger and also effectively improving a supercharging efficiency.

In order to achieve the above object, a multi-stage supercharging apparatus of the present invention includes a first supercharger and a second supercharger which are driven by an exhaust gas of an engine, wherein the first supercharger is provided with a first turbine, a first turbine accommodating section which accommodates the first turbine, a first exhaust inlet which is directly connected to an exhaust gas manifold of the engine to allow the exhaust gas manifold to be communicated with the first turbine accommodating section, and a first exhaust outlet which extends in an axial direction of the first turbine from the first turbine accommodating section and is bent upward to upwardly open, the second supercharger is provided with a second turbine, a second turbine accommodating section which accommodates the second turbine, and a second exhaust inlet which is directly connected to the first exhaust outlet to allow the first exhaust outlet to be communicated with the second turbine accommodating section, and the second supercharger is supported by the first supercharger by placing an opening of the second exhaust inlet on an opening of the first exhaust outlet.

Further, a first flange may be provided in the opening of the first exhaust outlet and a second flange may be provided in the opening of the second exhaust inlet, and the first flange and the second flange may be directly connected to each other in a state where flange surfaces are mutually horizontal.

Further, a by-pass channel may be integrally formed in the first supercharger to allow the first exhaust inlet to be communicated with the second exhaust inlet by detouring around the first turbine accommodating section.

Further, a flow rate adjusting valve which adjusts a flow rate of an exhaust gas flowing along the by-pass channel may be further included.

According to a multi-stage supercharging apparatus of the present invention, it is possible to improve the seal property in a connection portion of a high-pressure stage turbocharger and a low-pressure stage turbocharger and to effectively improve a supercharging efficiency.

DETAILED DESCRIPTION

Figure 1:
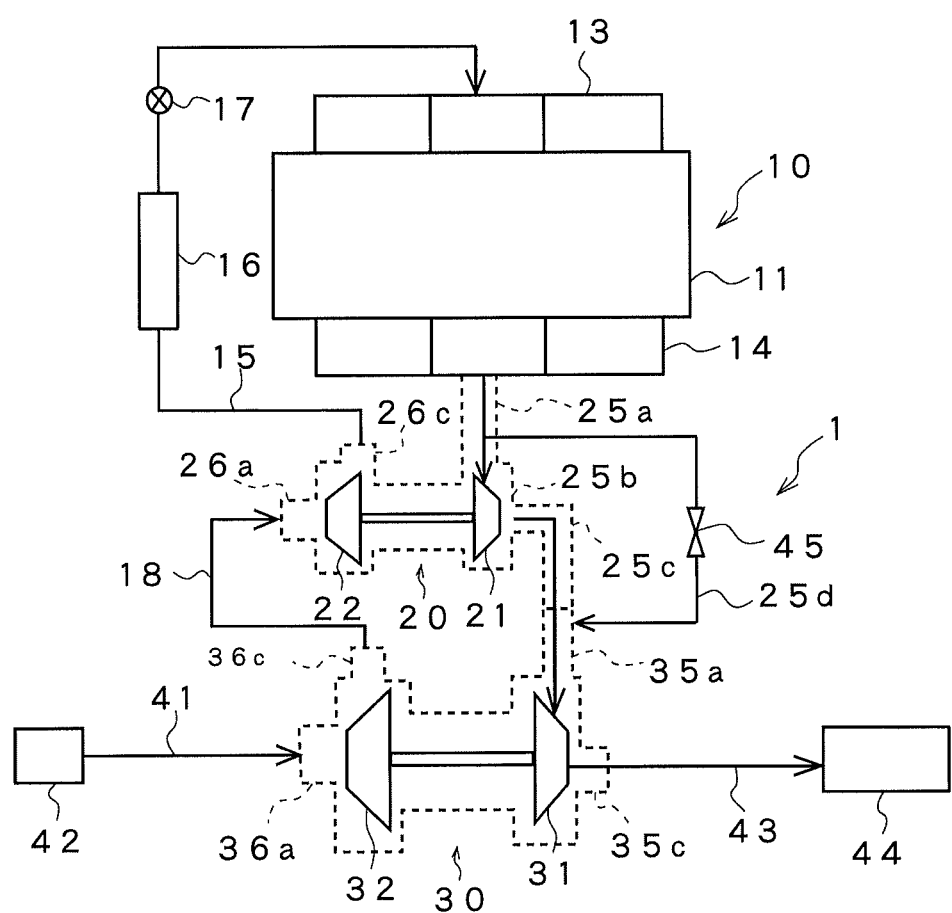
FIG. 1 is a schematic entire configuration diagram illustrating a multi-stage supercharging apparatus according to an embodiment of the present invention.

A multi-stage supercharging apparatus according to an embodiment of the present invention will be described below with reference to FIGS. 1 to 5. The same reference numerals can be designated to the same components having the same names and functions. Accordingly, a detailed description of these components will not be repeated.

A multi-stage supercharging apparatus 1 according to the embodiment of the present invention, as illustrated in FIG. 1, is attached to a diesel engine 10 (hereinafter, simply referred to as an engine) to be mounted on a vehicle and includes a high-pressure stage turbocharger 20 and a low-pressure stage turbocharger 30 larger in capacity than the high-pressure stage turbocharger 20. In addition, the high-pressure stage turbocharger 20 of the present embodiment is equivalent to a first supercharger of the present invention. Further, the low-pressure stage turbocharger 30 of the present embodiment is equivalent to a second supercharger of the present invention.

An intake manifold 13 and an exhaust gas manifold 14 are provided to a cylinder header 11 of the engine 10. A high-pressure stage exhaust inlet 25*a* of the high-pressure stage turbocharger 20 is directly connected to the exhaust gas manifold 14. A downstream end of a high-pressure intake passage 15 is connected to the intake manifold 13 to introduce a high-pressure intake air sent from the high-pressure stage turbocharger 20. Moreover, an intercooler 16 for cooling the intake air and a throttle valve 17 for adjusting the amount of the intake air are provided to the high-pressure intake passage 15.

An upstream end of the high-pressure intake passage 15 is connected to a high-pressure stage intake outlet 26*c* of the high-pressure stage turbocharger 20 and a downstream end of a low-pressure intake passage 18 is connected to a high-pressure stage intake inlet 26*a*. In addition, a low-pressure stage exhaust inlet 35*a* of the low-pressure stage turbocharger 30 is directly connected to a high-pressure stage exhaust outlet 25*c* of the high-pressure stage turbocharger 20. That is, the high-pressure stage turbocharger 20 is configured such that a high-pressure stage turbine 21 is rotationally driven using the exhaust energy of the engine 10 and a low-pressure intake air to be compressively supplied from a low-pressure stage compressor 32 is additionally compressed by a rotation of a high-pressure stage compressor 22 provided coaxially with the high-pressure stage turbine 21 and then is supplied to the engine 10.

An upstream end of the low-pressure intake passage 18 is connected to a low-pressure stage intake outlet 36*c* of the low-pressure stage turbocharger 30. In addition, an air cleaner 42 is connected to a low-pressure stage intake inlet 36*a* of the low-pressure stage turbocharger 30 through an intake passage 41. Further, an exhaust gas purification device 44 is connected to a low-pressure stage exhaust outlet 35*c* of the low-pressure stage turbocharger 30 through an exhaust passage 43. That is, the low-pressure stage turbocharger 30 is configured such that a low-pressure stage turbine 31 is rotationally driven using the exhaust energy of the engine 10 and an intake air introduced through the air cleaner 42 is compressed by a rotation of the low-pressure stage compressor 32 provided coaxially with the low-pressure stage turbine 31 and then is supplied to the high-pressure stage compressor 22.

The high-pressure stage exhaust inlet 25*a* of the high-pressure stage turbocharger 20 and the low-pressure stage exhaust inlet 35*a* of the low-pressure stage turbocharger 30 are communicated with each other by a by-pass channel 25*d* which detours around a high-pressure stage turbine accommodating section 25*b*. In addition, a flow rate adjusting valve 45 is provided at a by-pass outlet (downstream side) of the by-pass channel 25*d* to adjust the flow rate of exhaust gases which flow along the by-pass channel 25*d*. A valve opening degree of the flow rate adjusting valve 45 is controlled according to an operation state of the engine 10 by an ECU (Electronic Control Unit) which is not illustrated. That is, the valve opening degree of the flow rate adjusting valve 45 is controlled to zero (valve-closed state) in a low rotation region of the engine 10. Then, as the rotation of the engine 10 rises, the valve opening degree of the flow rate adjusting valve 45 is controlled so as to become larger.

Next, a structure of the high-pressure stage turbocharger 20 and the low-pressure stage turbocharger 30 will be described with reference to FIGS. 2 to 4.

Figure 4:
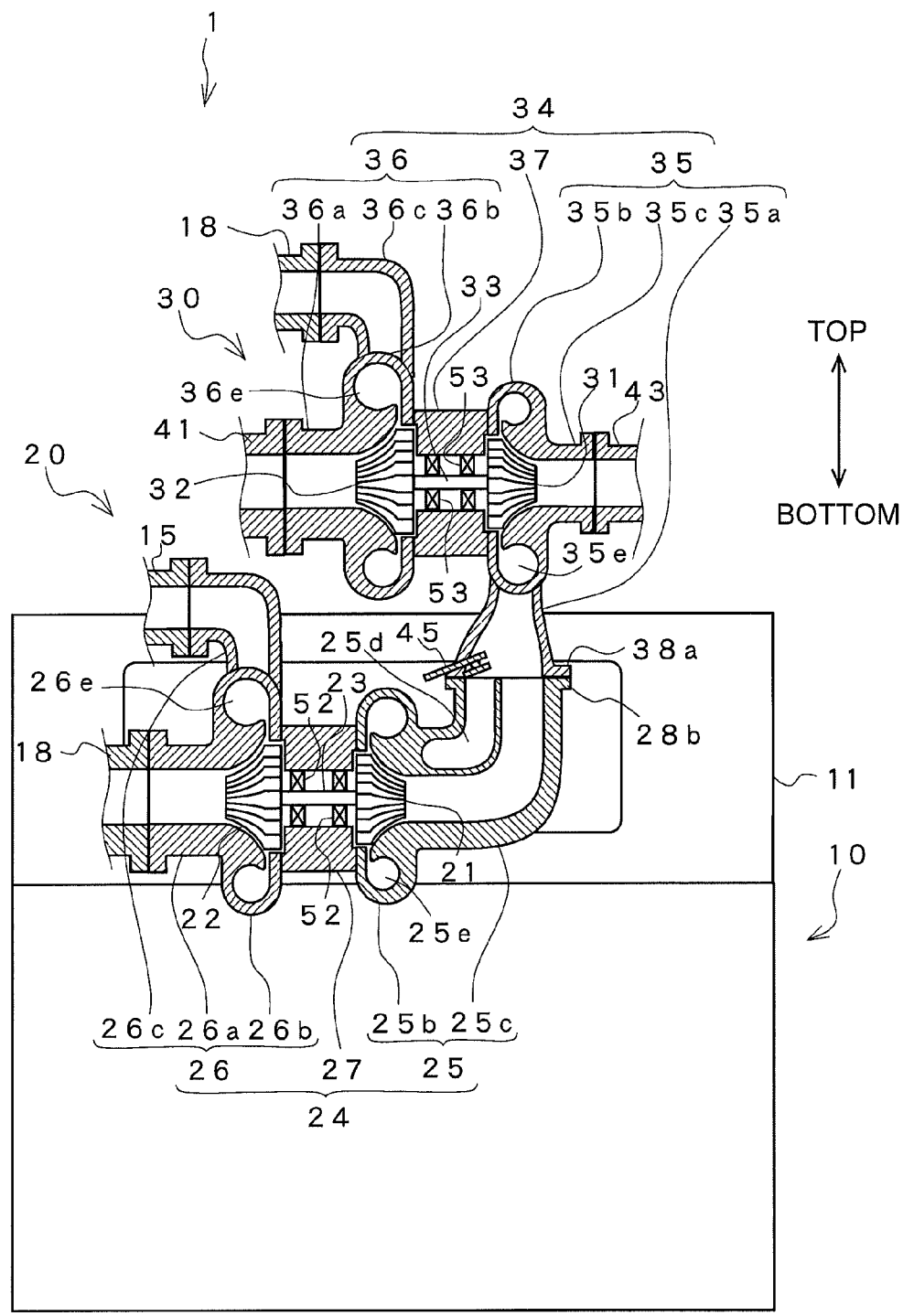
FIG. 4 is a sectional view taken along line B-B in FIG. 3.

The high-pressure stage turbocharger 20, as illustrated in FIG. 4, includes the high-pressure stage turbine 21 which is rotationally driven by the exhaust gas, the high-pressure stage compressor 22 which compresses the intake air, a high-pressure stage rotor shaft 23 which connects the high-pressure stage turbine 21 and the high-pressure stage compressor 22 to each other, and a high-pressure stage housing 24. In addition, the high-pressure stage housing 24, as illustrated in FIGS. 2 and 4, includes a high-pressure stage turbine housing section 25, a high-pressure stage compressor housing section 26, and a high-pressure stage bearing housing section 27.

The high-pressure stage bearing housing section 27 is located in a central portion of the high-pressure stage housing 24, and one end-side (right side in FIGS. 2 and 4) thereof is attached to the high-pressure stage turbine housing section 25 by a bolt fastening and the other end-side (left side in FIGS. 2 and 4) thereof is attached to the high-pressure stage compressor housing section 26 by the bolt fastening. As illustrated in FIG. 4, in addition, a pair of bearings 52 is provided in the high-pressure stage bearing housing section 27, and the high-pressure stage rotor shaft 23 is rotatably supported by these bearings 52.

Figure 5:
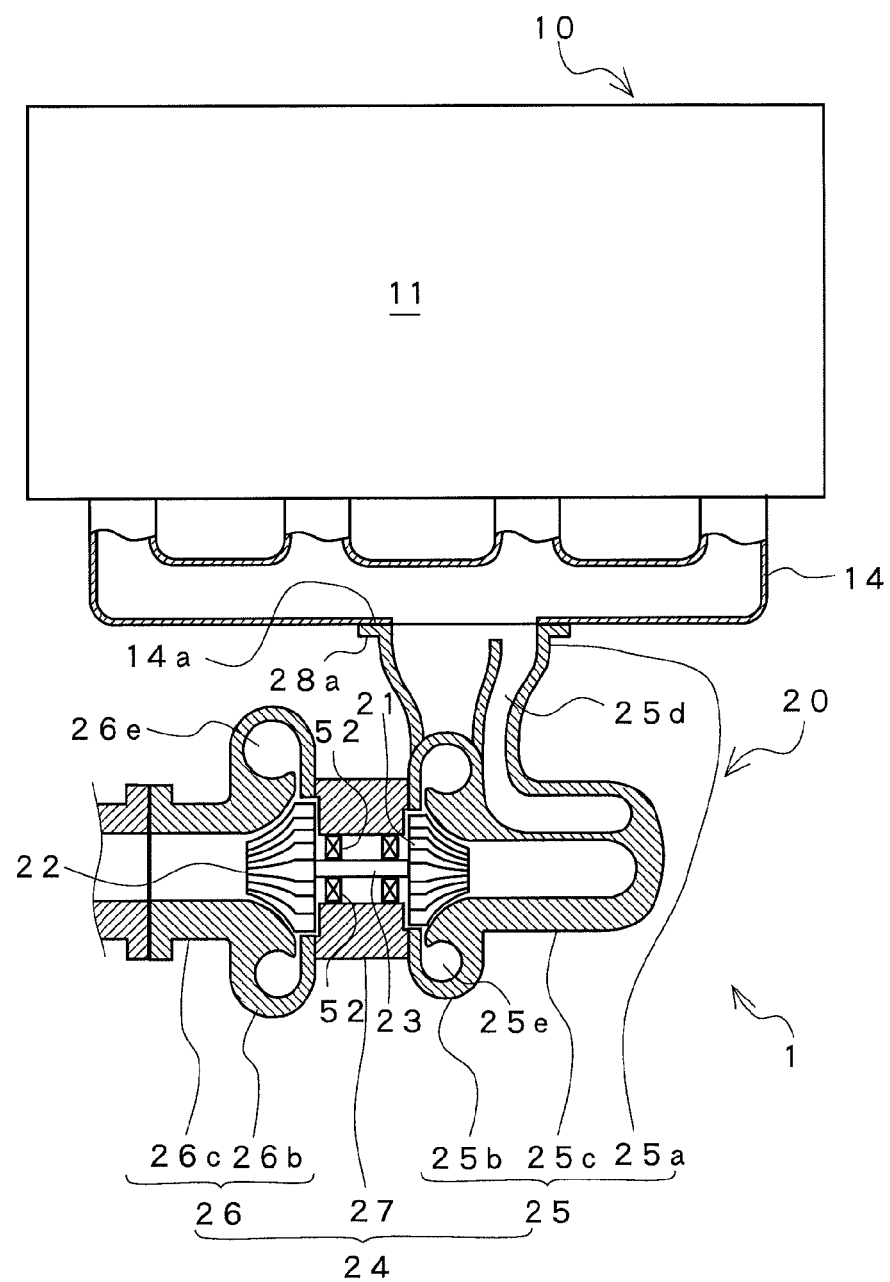
FIG. 5 is a sectional view taken along line A-A in FIG. 2.

The high-pressure stage turbine housing section 25, as illustrated in FIGS. 4 and 5, includes the high-pressure stage exhaust inlet 25*a* (see FIG. 5) which takes in the exhaust gas from the engine 10, the high-pressure stage turbine accommodating section (a first turbine accommodating section) 25*b* which accommodates the high-pressure stage turbine 21, the high-pressure stage exhaust outlet (a first exhaust outlet) 25*c* which discharges the exhaust gas, and the by-pass channel 25*d*. In addition, an annular high-pressure stage turbine scroll channel 25*e* is formed outside a radial direction of the high-pressure stage turbine 21 in the high-pressure stage turbine accommodating section 25*b*.

Figure 3:
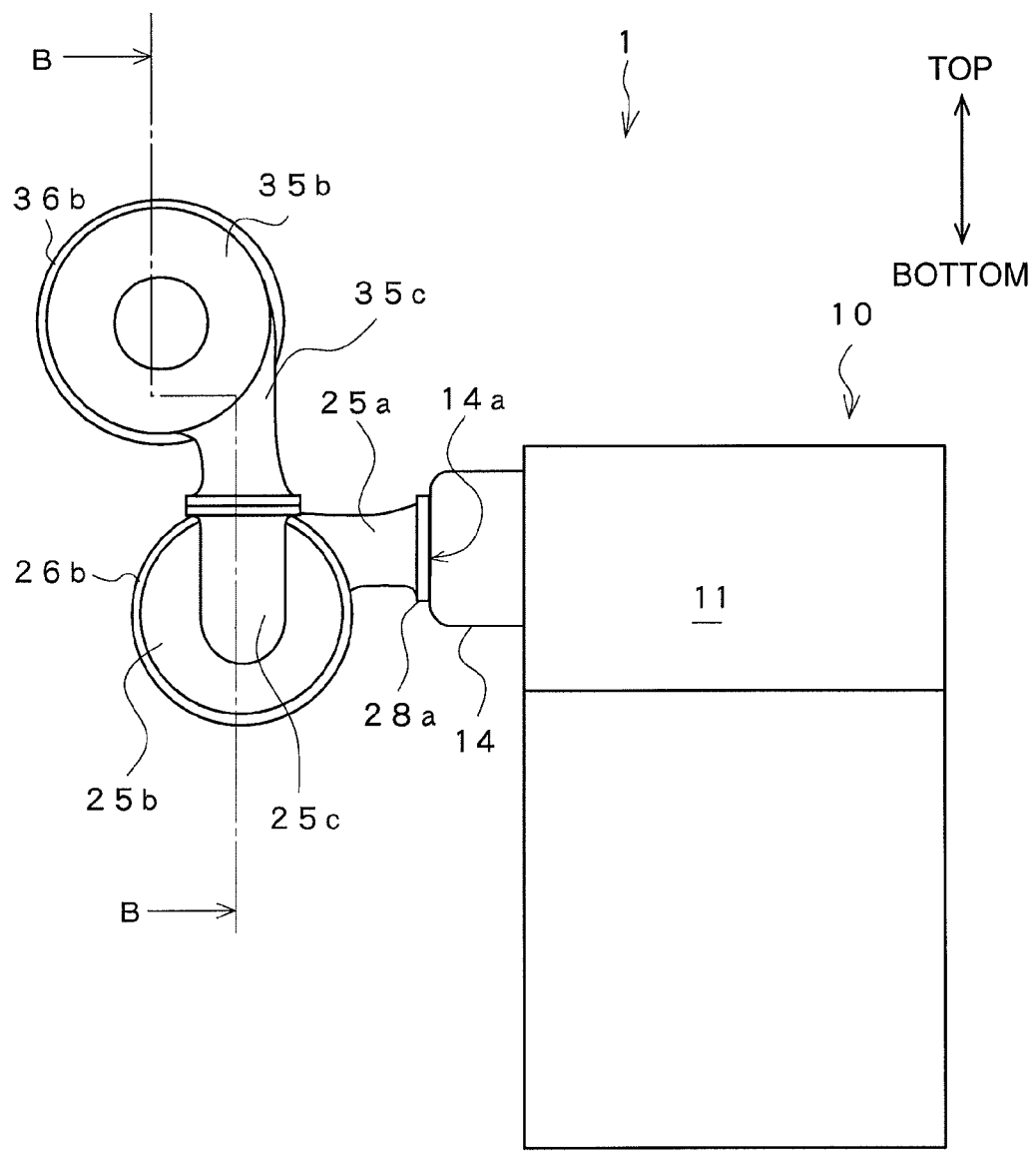
FIG. 3 is a schematic side view illustrating a side structure of the multi-stage supercharging apparatus according to the embodiment of the present invention.

As illustrated in FIGS. 3 and 5, a flange 28*a*, which is fixed to an exhaust outlet 14*a* of the exhaust gas manifold 14 by the bolt fastening, is provided at an upstream end of the high-pressure stage exhaust inlet (a first exhaust inlet) 25*a*. In addition, a downstream end of the high-pressure stage exhaust inlet 25*a* is communicated with the interior of the high-pressure stage turbine accommodating section 25*b* through the high-pressure stage turbine scroll channel 25*e*.

Figure 2:
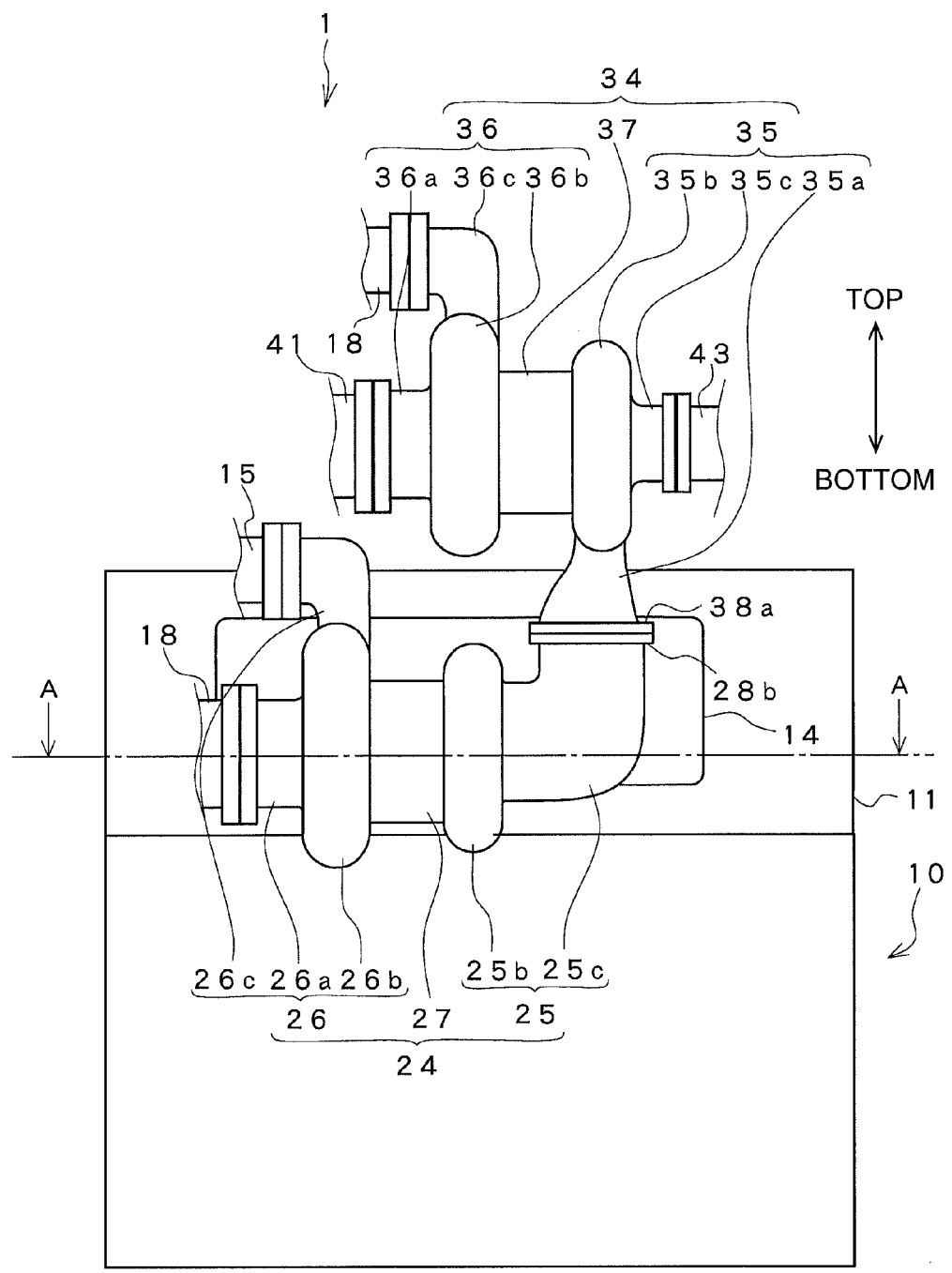
FIG. 2 is a schematic front view illustrating a front structure of the multi-stage supercharging apparatus according to the embodiment of the present invention.

The high-pressure stage exhaust outlet 25*c*, as illustrated in FIGS. 2 and 4, is formed by extending in an axial direction of the high-pressure stage rotor shaft 23 from the high-pressure stage turbine accommodating section 25*b* and bending upward to upwardly open. In addition, an opening (downstream end) of the high-pressure stage exhaust outlet 25*c* is provided with a flange (a first flange) 28*b* to be fastened with a flange (a second flange) 38*a* of the low-pressure stage exhaust inlet 35*a* by a bolt, which will be described later, respectively. That is, the flange 28*b* of the high-pressure stage exhaust outlet 25*c* and the flange 38*a* of the low-pressure stage exhaust inlet 35*a* are fixed to each other in a state where flange surfaces are mutually horizontal. Thus, the flange surfaces are fixed to each other in the mutually horizontal state so that the low-pressure stage turbocharger 30 is configured to be supported by the high-pressure stage turbocharger 20.

The by-pass channel 25*d*, as illustrated in FIGS. 4 and 5, allows the high-pressure stage exhaust inlet 25*a* to be communicated with the low-pressure stage exhaust inlet 35*a* by detouring around the high-pressure stage turbine accommodating section 25*b*. The by-pass channel 25*d* is integrally formed in the high-pressure stage exhaust inlet 25*a* and the high-pressure stage exhaust outlet 25c so that an upstream end of a by-pass inlet is provided in the high-pressure stage turbine accommodating section 25b and a downstream end of a by-pass outlet is provided at the same flange surface as the flange 28b.

The high-pressure stage compressor housing section 26, as illustrated in FIGS. 4 and 5, includes the high-pressure stage intake inlet 26a which takes in the intake air from the low-pressure stage turbocharger 30, a high-pressure stage compressor accommodating section 26b which accommodates the high-pressure stage compressor 22, and the high-pressure stage intake outlet 26c which discharges the intake air. In addition, an annular high-pressure stage compressor scroll channel 26e is formed outside a radial direction of the high-pressure stage compressor 22 in the high-pressure stage compressor accommodating section 26b.

As illustrated in FIGS. 2 and 4, a downstream end of the low-pressure intake passage 18 is fixed to an upstream end of the high-pressure stage intake inlet 26a. In addition, an upstream end of the high-pressure intake passage 15 is fixed to a downstream end of the high-pressure stage intake outlet 26c.

The low-pressure stage turbocharger 30, as illustrated in FIGS. 4 and 5, includes the low-pressure stage turbine (a second turbine) 31 which is rotationally driven by the exhaust gas, the low-pressure stage compressor 32 which compresses the intake air, a low-pressure stage rotor shaft 33 which allows the low-pressure stage turbine 31 to be connected with the low-pressure stage compressor 32, and a low-pressure stage housing 34. In addition, the low-pressure stage housing 34, as illustrated in FIGS. 2 and 4, includes a low-pressure stage turbine housing section 35, a low-pressure stage compressor housing section 36, and a low-pressure stage bearing housing section 37.

The low-pressure stage bearing housing section 37 is located in a central portion of the low-pressure stage housing 34, and one end-side (right side in FIGS. 2 and 4) thereof is attached to the low-pressure stage turbine housing section 35 by a bolt fastening and the other end-side (left side in FIGS. 2 and 4) thereof is attached to the low-pressure stage compressor housing section 36 by the bolt fastening. As illustrated in FIG. 4, in addition, a pair of bearings 53 is provided in the low-pressure stage bearing housing section 37, and the low-pressure stage rotor shaft 33 is rotatably supported by these bearings 53.

The low-pressure stage turbine housing section 35, as illustrated in FIGS. 4 and 5, includes the low-pressure stage exhaust inlet (a second exhaust inlet) 35a which takes in the exhaust gas passed through the high-pressure stage turbocharger 20 or the exhaust gas passed through the by-pass channel 25d, a low-pressure stage turbine accommodating section (a second turbine accommodating section) 35b which accommodates the low-pressure stage turbine 31, and the low-pressure stage exhaust outlet 35c which discharges the exhaust gas. In addition, an annular low-pressure stage turbine scroll channel 35e is formed outside a radial direction of the low-pressure stage turbine 31 in the low-pressure stage turbine accommodating section 35b.

As illustrated in FIG. 4, a flange 38a, which is fixed with the flange 28b of the high-pressure stage exhaust outlet 25c by the bolt fastening, is provided at an opening (upstream end) of the low-pressure stage exhaust inlet 35a. In addition, a downstream end of the low-pressure stage exhaust inlet 35a is communicated with the interior of the low-pressure stage turbine accommodating section 35b through the low-pressure stage turbine scroll channel 35e. Moreover, an upstream end of the exhaust passage 43 is fixed to a downstream end of the low-pressure stage exhaust outlet 35c through the flange by the bolt fastening.

The low-pressure stage compressor housing section 36, as illustrated in FIG. 4, includes the low-pressure stage intake inlet 36a which takes in the intake air through the air cleaner, a low-pressure stage compressor accommodating section 36b which accommodates the low-pressure stage compressor 32, and the low-pressure stage intake outlet 36c which discharges the intake air. In addition, an annular low-pressure stage compressor scroll channel 36e is formed outside a radial direction of the low-pressure stage compressor 32 in the low-pressure stage compressor accommodating section 36b.

As illustrated in FIGS. 2 and 4, a downstream end of the intake passage 41 is fixed to an upstream end of the low-pressure stage intake inlet 36a. In addition, an upstream end of the low-pressure intake passage 18 is fixed to a downstream end of the low-pressure stage intake outlet 36c.

With the above-described configuration, the multi-stage supercharging apparatus 1 according to the embodiment of the present invention achieves the following effects.

The high-pressure stage exhaust outlet 25c of the high-pressure stage turbocharger 20 is formed by extending in the axial direction of the high-pressure stage rotor shaft 23 from the high-pressure stage turbine accommodating section 25b and bending upward to upwardly open. Then, the flange 28b provided in the opening (downstream end) of the high-pressure stage exhaust outlet 25c and the flange 38a provided in the opening (upstream end) of the low-pressure stage exhaust inlet 35a are fixed to each other by the bolt fastening in a state where the flange surfaces are mutually horizontal. That is, the flange 38a of the low-pressure stage exhaust inlet 35a is placed and fixed to the upper part of the flange 28b of the high-pressure stage exhaust outlet 25c so that the low-pressure stage turbocharger 30 is supported by the high-pressure stage turbocharger 20.

Accordingly, since the low-pressure stage turbocharger 30 is securely supported by the high-pressure stage turbocharger 20, it is possible to omit or simplify the supporting bracket which allows the low-pressure stage turbocharger 30 to be fixed to, for example, the engine 10.

In addition, since the high-pressure stage turbocharger 20 and the low-pressure stage turbocharger 30 are fixed to each other in the state where the flange surfaces, a connection portion of each other, are horizontal, the weight of the low-pressure stage turbocharger 30 is applied to the connection portion from top to bottom.

Therefore, it is possible to effectively improve the seal property in the connection portion of the high-pressure stage turbocharger 20 and the low-pressure stage turbocharger 30.

In addition, the high-pressure stage exhaust inlet 25a of the high-pressure stage turbocharger 20 is directly connected to the exhaust gas manifold 14 and the high-pressure stage exhaust outlet 25c of the high-pressure stage turbocharger 20 is directly connected to the low-pressure stage exhaust inlet 35a of the low-pressure stage turbocharger 30. Moreover, the by-pass channel 25d is integrally formed in the high-pressure stage exhaust inlet 25a and the high-pressure stage exhaust outlet 25c.

Accordingly, it is possible to reduce the channel resistance of the exhaust gas and also effectively improve the supercharging efficiency of the multi-stage supercharging apparatus 1 by compacting the connection of the high-pressure stage turbocharger 20 and the low-pressure stage turbocharger 30.

Moreover, the present invention is not limited to the above-described embodiment and may be modified without departing from the spirit of the present invention.

For example, it has been described that the flange 38a is placed and fixed to the upper part of the flange 28b so that the low-pressure stage turbocharger 30 is supported by the high-pressure stage turbocharger 20, but the opening of the high-pressure stage exhaust outlet 25c may be directly connected to the opening of the low-pressure stage exhaust inlet 35a without these flanges 28b and 38a. Even in this case, it is possible to achieve the same effects as in the above-described embodiment.

Further, it has been described that the by-pass outlet (downstream end) of the by-pass channel 25d is provided at the same flange surface as the flange 28b, but it may be provided in the high-pressure stage exhaust outlet 25c.

In addition, the flow rate adjusting valve 45 may be provided at the by-pass inlet (upstream end) of the by-pass channel 25d or provided in the by-pass channel 25d.

The invention claimed is:

1. A multi-stage supercharging apparatus comprising:
   a first supercharger and a second supercharger which are driven by an exhaust gas of an engine; and
   an exhaust gas manifold entirely upstream of the first supercharger;
   the first supercharger including
      a first turbine,
      a first turbine accommodating section which accommodates the first turbine,
      a first exhaust inlet which is directly connected to the exhaust gas manifold of the engine to allow the exhaust gas manifold to be communicated with the first turbine accommodating section, and
      a first exhaust outlet which extends in an axial direction of the first turbine from the first turbine accommodating section and is bent upward to upwardly open;
   the second supercharger including
      a second turbine,
      a second turbine accommodating section which accommodates the second turbine, and
      a second exhaust inlet which is directly connected to the first exhaust outlet of the first supercharger to allow the first exhaust outlet of the first supercharger to be communicated with the second turbine accommodating section;
   the second supercharger is supported by the first supercharger by placing an opening of the second exhaust inlet of the second supercharger on an opening of the first exhaust outlet of the first supercharger;
   a first flange at the opening of the first exhaust outlet of the first supercharger and having a surface,
   a second flange at the opening of the second exhaust inlet of the second supercharger and having a surface,
   the surfaces of the first flange of the first supercharger and the second flange of the second supercharger are horizontally and directly connected to each other,
   a by-pass channel integrally formed in the first supercharger, detouring around the first turbine accommodating section of the first supercharger and communicating the first exhaust inlet of the first supercharger with the second exhaust inlet of the second turbocharger;
   a downstream end of the by-pass channel is provided at the same flange surface as the first flange of the first supercharger,
   wherein the by-pass channel is separated from the first exhaust outlet of the first supercharger until a position of the surface of the first flange of the first supercharger in a direction of the exhaust gas flow; and
   a flow rate adjusting valve which adjusts a flow rate of the exhaust gas in the by-pass channel and which is provided at the downstream end of the by-pass channel.

* * * * *